United States Patent [19]

Jacob et al.

[11] Patent Number: 4,715,084
[45] Date of Patent: Dec. 29, 1987

[54] HAND VACUUM CLEANER

[75] Inventors: Gernot Jacob, Weissach-Flacht; Leon Radom, Ellhofen, both of Fed. Rep. of Germany

[73] Assignee: Progress-Elektrogeraete Mauz & Pfeiffer GmbH & Co., Neurtingen, Fed. Rep. of Germany

[21] Appl. No.: 862,214

[22] PCT Filed: Sep. 16, 1985

[86] PCT No.: PCT/EP85/00475
§ 371 Date: May 8, 1986
§ 102(e) Date: May 8, 1986

[87] PCT Pub. No.: WO86/01703
PCT Pub. Date: Mar. 27, 1986

[30] Foreign Application Priority Data

Sep. 17, 1984 [DE] Fed. Rep. of Germany ........ 8427360

[51] Int. Cl.$^4$ .............................................. A47L 9/32
[52] U.S. Cl. ........................................ 15/328; 15/329; 15/344; 15/350; 15/410
[58] Field of Search .............. 15/350, 351, 410, 344, 15/328, 329; 285/7, 12, 312, 314

[56] References Cited

U.S. PATENT DOCUMENTS

| 2,582,446 | 1/1962 | Martinet | 285/7 |
| 3,239,243 | 3/1966 | Grellsson | 285/312 X |
| 4,519,635 | 5/1985 | McMath | 285/312 X |

FOREIGN PATENT DOCUMENTS

| 24668 | 6/1919 | Denmark | 15/344 |
| 1910444 | 9/1970 | Fed. Rep. of Germany . | |
| 2932017 | 2/1981 | Fed. Rep. of Germany | 15/410 |
| 1351586 | 12/1963 | France | 15/344 |
| 1451080 | 8/1966 | France | 285/312 |

Primary Examiner—Chris K. Moore
Attorney, Agent, or Firm—Birch, Stewart, Kolasch & Birch

[57] ABSTRACT

The hand vacuum cleaner comprises a fan arranged in a vacuum cleaner housing, and a dust collector. The handle of the vacuum cleaner is connectable with the housing. At the suction stub of the vacuum cleaner there may be attached an intermediate pipe which is to be connected with a suction tool. An intermediate pipe is provided which is detachably positioned between the vacuum cleaner housing and the handle. Locks are provided to attach this intermediate pipe to the vacuum cleaning housing and the handle, such having a clamp handle for releasing and tightening of the clamps.

7 Claims, 5 Drawing Figures

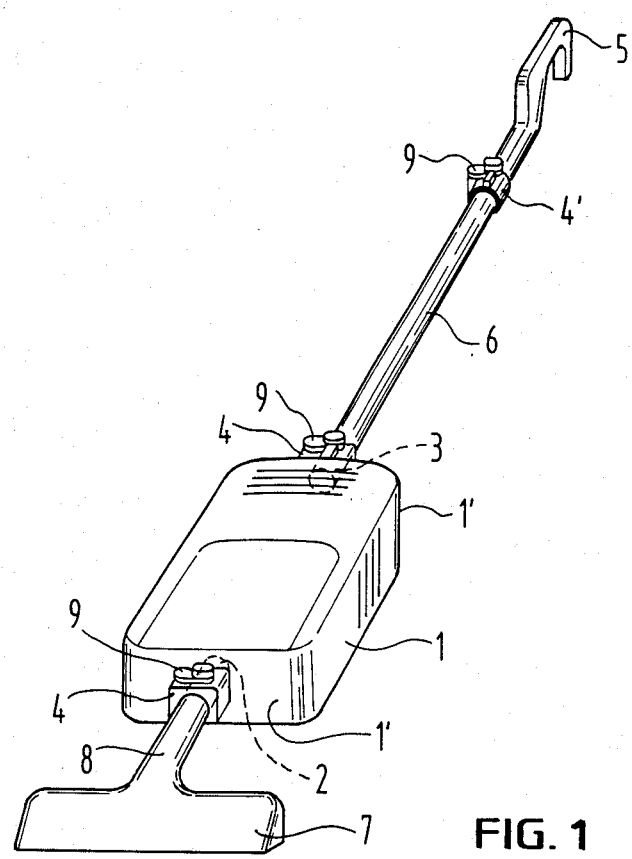
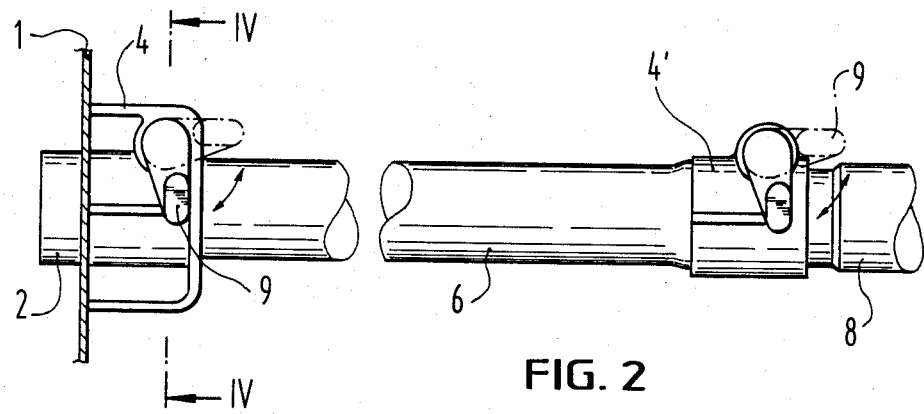
FIG. 1
FIG. 2

HAND VACUUM CLEANER

FIELD OF THE INVENTION

The invention relates to a hand vacuum cleaner, comprising a housing receiving the suction fan and the dust collector having a suction stub and being connected to a handle, a lockable intermediate pipe being attachable to the suction stub.

DESCRIPTION OF THE BACKGROUND ART

It is well known in the art to connect the suction tool of a hand vacuum cleaner with the suction stub of the housing by means of a frictionally connected plug connection. Such a suction tool may be a tulle or cross nozzle, carpet nozzle, upholster nozzle, radiator nozzle and the like. If the housing is too close to the suction nozzle, thus impeding the vacuum cleaning operation, use is made of an intermediate pipe, which is insertable between the suction stub of the housing and the suction tool. "Plug connections" are made as plug cones to provide a relatively simple and tight connection between the pipe members. It is often difficult and inconvenient to separate such connected members. Often the only manner to disconnect the inner and the outer cones of the frictionally connected plug is by the use of force or by warming up the overlapping portion of the cone-shaped plug connection.

In other hand vacuum cleaners this disadvantage is avoided by lockable plug connections for the pipe members. In such form-fitting plug connections the connection ends of the pipe members are made cylindrical, and a spring biased detent or a notch such as a ball notch, may be provided for fastening the two together. The spring biased detent or notch ball may be arranged on the inner pipe of the plug connection and engages with a notch opening of the outer pipe. For separating the connection the spring-biased detent is pressed down by a finger against the force of a spring so that the pipe members of the plug connection may be separated by relatively gently pulling the two apart. The disadvantage of such connections is that when pressing the spring-biased detent or notch ball and simultaneously shifting the pipe members in the direction of their axes, the skin of the finger, which presses the ball downwards, may be injured. Another disadvantage is that in some of these connections, the spring pressure is too low or that the spring tension weakens so that the plug connection loosens when under tensile stress as is often unavoidable in vacuum cleaning operations.

For easier handling of the vacuum cleaner it is useful to have the center of gravity of the vacuum cleaner as low as possible, particularly for "overhead" cleaning operations, e.g. for cleaning curtains or the like. When performing other vacuum cleaning operations, e.g. when cleaning the floor under the beds, the housing becomes an impedient because it is often arranged too close to the nozzle so that in this case it is convenient to use an intermediate pipe; however, after inserting the intermediate piece the vacuum cleaner becomes too long, thus being unwieldy.

SUMMARY OF THE INVENTION

It is an object of this invention to facilitate handling of the vacuum cleaner. Even when using an intermediate pipe the length of the vacuum cleaner shall not be changed. The object of the invention is achieved by providing a hand vacuum cleaner comprising, a housing receiving a suction fan and a dust collector, a handle detachably connected to said housing, a suction stub attached to said housing, an intermediate pipe detachably connected to said housing via said suction stub, said intermediate pipe being capable of being removed from said suction stub and being reattached to another portion of said housing intermediate said housing and said handle, said intermediate pipe having a slot and a depression in one end thereof, said depression having a given depth, and at least one clamp for lockably attaching said intermediate pipe to said housing, said at least one clamp comprising a plug-in detent which cooperates with said slot of said intermediate pipe in order to actually align said intermediate pipe, said at least one clamp further comprising a rotatable cotter being eccentrically rotatable in order to move a portion of said cotter into said depression of said intermediate pipe, the movement of said cotter toward said depression being a distance which is substantially equivalent to the depth of said depression.

During normal vacuum cleaning operations the intermediate pipe is arranged between the housing and the handle. On the one hand it is locked with the fastening stop of the housing and and on the other hand with the handle by means of a plug connection which is made as a clamp. If the floor under a bed or the like is to be vacuum-cleaned, the lockings of the clamps are disconnected. The thus disconnected intermediate pipe is fastened to the suction stub while the other end of the intermediate pipe is attached to the suction tool. The thus joined pieces are now relatched. Finally, the free handle is then placed upon the fastening stub of the housing and locked with said housing. By exchanging the intermediate pipe the entire length of the vacuum cleaner is retained. For vacuum cleaning operations in narrow rooms, e.g. in a motor vehicle, the length of the vacuum cleaner may also be shortened by removing the intermediate pipe.

The intermediate pipe can be connected with the clamp of the other pipe member only in one definite position. At the end of the connection, e.g. of the intermediate pipe, there is embedded a slot, whereas in the clamp of the other pipe member, e.g. of the suction stub, there is arranged a plug-in tongue in detent engaging in the slot. The plug-in distance is limited by the length of the slot. The clamp consisting of a clamp housing and rotatable cotter or cam with a clamp handle further comprises a stop for limiting the rotation angle of the rotatable cotter. Further, at the connection end of the pipe member—seen in longitudinal cross-section—there is embedded a circular depression. The pipe member being inserted in the clamp, said depression is opposite to the rotatable cotter in a manner that when operating the clamp by the clamp handle the rotatable cotter partially engages in the depression. The intermediate pipe and the suction tool of the handle respectively are thus form-fitting and clamping. At one end for fastening the intermediate pipe the clamp is provided while at the other end for fastening a slot and a depression is incorporated.

Within the scope of the invention it is possible to provide the clamp, which is shown here as a rotatable cotter locking, with a traction cotter, which is operable by means of a clamp handle. Further there is a possibility of providing the connection ends of suplementary tools, such as hose pipe lengthening pieces, suction hoods and the like, with the above-described clamp and clutch members.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a perspective view of the vacuum cleaner of the present invention;

FIG. 2 shows an intermediate pipe;

DETAILED DESCRIPTION OF THE PREFERRED EMBODIMENTS

Figure 3:
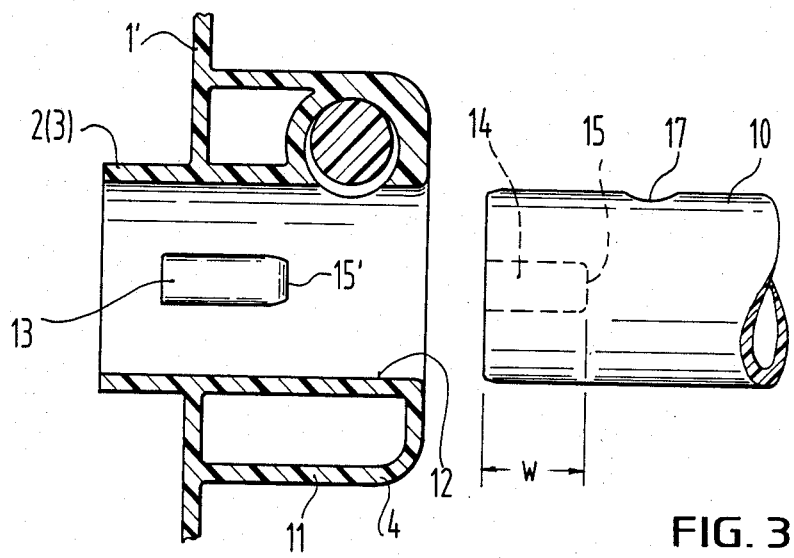
FIG. 3 is a longitudinal cross-section of a clamp with a clutch end of a pipe member.

Referring in detail to the drawings and with particular reference to FIG. 1, a vacuum cleaner is shown with a housing 1 having a blower and a dust collector being arranged therein. On the one side the housing is provided with suction stub 2 and on the other side with handle stub 3. Preferably stubs 2 and 3 are components of housing 1 and of a clamp 4. In the example herein, there is arranged an intermediate pipe 6 between handle 5 and handle stub 3, which intermediate pipe is fastened by clamps 4. The intermediate pipe being thus arranged, the center of gravity is low so that for normal vacuum cleaning operations, such as for vacuum-cleaning the floor, the vacuum cleaner can be easily handled. The suction stub is provided with suction tool 7, which in the present case is a transverse nozzle. For vacuum cleaning the floor under a bed, a wardrobe or the like, the intermediate pipe is removed by releasing clamps 4 and inserting it between suction tool 7 and suction stub 2 The handle 5 is then attached to the handle stub 3 of housing 1. The entire length of the vacuum cleaner is not changed by exchanging the intermediate pipe 6.

As further shown in FIG. 2, intermediate pipe 6 is connected with handle stub 3 of housing 1 by means of clamp 4, whereas the other end of the intermediate pipe 6 forms a clamp 4' which may connect to handle 5. Each clamp has a clamp handle 9 for releasing and tightening the clamp. In the position of the feed handle shown by a continuous line, the clamp is in the tightened state. In the position of the clamp handle shown by a dotted line, the clamp is in the released state. When vacuum cleaning the floor under a bed or the like, the intermediate pipe 6 is to be inserted between suction tool 7 (FIG. 1) and suction stub 2. This is performed by bringing the clamp handles 9 to the position shown by a dotted line; in FIG. 2. The intermediate pipe may now be removed and arranged between the suction tool 7 and suction stub 2. The clamps at the suction stub and at the stub of suction tool 7 are then locked by clamp handles 9.

According to FIG. 3, pipe portion 10 which may be an intermediate pipe 6 is to be inserted into a clamp 4 which is shown in longitudinal cross-section. The clamp comprises essentially clamp housing 11 arranged at a portion of housing 1', with a plug-in bushing 12, into which pipe portion 10 is easily inserted by sliding fit. In the plug-in bushing, there is arranged a plug-in detent 13 while in pipe portion 10 there is embedded a slot 14. When the pipe portion is inserted in the plug-in bushing of the clamp the plug-in detent engages in the slot 14. The two ends 15 and 15' of the plug-in detent 13 and slot 14 limit the plug-in distance. In this position the pipe portion is lockable by the clamp. In the clamp housing 11 the rotatable cotter or cam 16 is pivotally attached in a receptacle 23, whereas in pipe portion 10 there is formed a depression 17. In the stop position of the members to be connected, the depression is opposite to the rotatable cotter or cam. When by means of feed handle 9 (FIGS. 1 and 4), which is connected with the rotatable cotter or cam, said rotatable cotter or cam is rotated in a semicircle. The cotter may then engage the depression so that the members to be connected are locked with each other by formlocking.

Figures 4, 5:
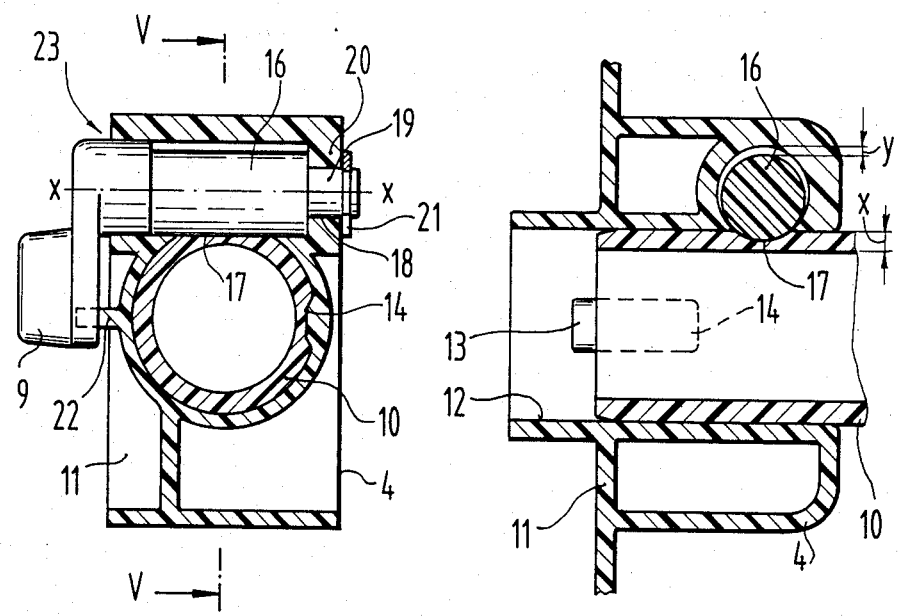
FIG. 4 is a radial cross-section through a clamp having an inserted pipe member.
FIG. 5 shows the clamp according to FIG. 3, with an inserted pipe member.

FIG. 4 is a section IV—IV (FIG. 2) through a clamp 4 with an inserted pipe portion 10, whereas FIG. 5 is an axial longitudinal cross section V—V through the clamp according to FIG. 4. In the position as shown, pipe portion 10 is locked with clamp 4. The rotatable cotter 16 connected with clamp handle 9 by means of a tenon 19, through a bore 18 in the bottom portion 20 of receptacle 23. A spring clip 21 is provided for securing the rotatable cotter or cam in its receptacle 23. The rotatable cotter or cam is positioned eccentrically to fulcrum "x" in a manner that when the feed handle is rotated in a semicircle such that it moves by the distance "y"—according to about half of the wall thickness "z" of pipe portion 10—the rotatable cotter or cam engages depression 17. In the tightened position of the rotatable cotter or cam as shown herein the clamp handle 9 is situated against a clamp handle stop 22 of clamp housing 11. This clamp handle stop 22 being in this case in the form of a rib.

Within the scope of this invention, clamp 4 may also have another form. Thus clamp 4' tightly connected at one end with the intermediate pipe 6 (FIG. 2) to form a unity structure does not comprise a clamp housing. This clamp 4 comprises a plug-in bushing 12 instead of the cotter receptacle 23. This bushing 12 holds the rotatable cotter or cam 16. The design of the rotatable cotter, its leading and securing is in accordance with the embodiment described and shown above.

The clamps 4 may be arranged, as shown above, at either side of the vacuum cleaner housing 1. However, there is also a possibility of tightly arranging the clamp only on one side, e.g. at the suction stub. In this case the handle should be provided with a clamp.

In the inventive embodiment described herein, the clamp comprises an accentrically rotatable cotter or cam. However, the cotter or cam may also be shaped as a traction cotter which is provided with a thread portion for example and is brought into the tightened position by the force of a spring. In this embodiment the clamp handle could bear the pertaining female screw thread.

The traction cotter may also be provided with a clamp handle working according to the type of a cover locking. However, the user of such lockings always runs the risk of becoming injured. Therefore the above-shown embodiment is a "best mode" and also inventive due to its simple structure and its security.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A hand vacuum cleaner comprising:
   a housing receiving a suction fan and a dust collector;
   a handle detachably connected to said housing;
   a suction stub attached to said housing;
   an intermediate pipe detachably connected to said housing via said suction stub, said intermediate pipe being capable of being removed from said suction stub and being reattached to another portion of said housing between said housing and said handle, said intermediate pipe having a slot and a depression in one end thereof, said depression having a given depth; and
   at least one clamp for lockably attaching said intermediate pipe to said housing, said at least one clamp comprising a plug-in detent which cooperates with said slot of said intermediate pipe in order to actually align said intermediate pipe, said at least one clamp further comprising a rotatable cotter being eccentrically rotatable in order to move a portion of said cotter into said depression of said intermediate pipe, the movement of said cotter toward said depression being a distance which is substantially equivalent to the depth of said depression.

2. The hand vacuum cleaner according to claim 1, wherein said at least one clamp is provided with a clamp housing and said clamp housing is located on at least one of said suction stub and a portion of said housing receiving said suction fan an dust collector.

3. The hand vacuum cleaner according to claim 1, wherein said intermediate pipe further includes one of said at least one clamps at an end thereof opposite the end having said slot and said depression.

4. The hand vacuum cleaner according to claim 1, further including a handle stub at said another portion of said housing to which said intermediate pipe can be connected, said handle stub further including one of said at least one clamps for locking at least one of said handle and said intermediate pipe to said housing.

5. The hand vacuum cleaner according to claim 1, wherein said another portion of said housing to which said intermediate pipe can be connected further includes one of said at least one clamps, said one of said at least one clamps locking one of said handle and said intermediate pipe to said housing.

6. The hand vacuum cleaner according to claim 5, wherein said intermediate pipe extending between said housing and said handle is locked at one end thereof to said housing via said one of said at least one clamps, said intermediate pipe further including another clamp at an opposite end thereof, said another clamp lockably attaching said handle to said intermediate pipe.

7. The hand vacuum cleaner according to claim 1, wherein said at least one clamp further includes a clamp housing and wherein said another portion of said housing to which said intermediate pipe can be connected includes a handle stub, said clamp housing, said handle stub, said suction stub and said housing receiving said suction fan and dust collector all forming a unitary structure.

* * * * *